United States Patent
Hacker et al.

(10) Patent No.: US 6,409,952 B1
(45) Date of Patent: Jun. 25, 2002

(54) DRYING AND PROCESSING CELLULOSIC COMPOUNDS

(75) Inventors: Wayne E. Hacker, Chillicothe; Matthew F. Kollar, Powell; Robert W. Heigel, Pataskala, all of OH (US)

(73) Assignee: Crane Plastics Company Limited Partnership, Columbus, OH (US)

( * ) Notice: Subject to any disclaimer, the term of this patent is extended or adjusted under 35 U.S.C. 154(b) by 0 days.

(21) Appl. No.: 09/443,694

(22) Filed: Nov. 19, 1999

Related U.S. Application Data

(60) Provisional application No. 60/110,028, filed on Nov. 25, 1998.

(51) Int. Cl.⁷ ............................................. B29C 47/00
(52) U.S. Cl. .............................. 264/171.1; 264/173.13; 264/176.1
(58) Field of Search ............................... 264/204, 176.1, 264/344, 171.1, 172.11, 173.13; 425/200

(56) References Cited

U.S. PATENT DOCUMENTS

| | | | |
|---|---|---|---|
| 3,681,855 A | * 8/1972 | Weisselberg et al. | .......... 34/173 |
| 3,777,409 A | * 12/1973 | Weisselberg et al. | .......... 34/173 |
| 3,993,408 A | * 11/1976 | Arons et al. | |
| 4,228,116 A | * 10/1980 | Colombo et al. | |
| 4,746,688 A | * 5/1988 | Bistak et al. | |
| 5,484,501 A | 1/1996 | Jacobsen, Jr. et al. | ...... 156/209 |
| 5,515,471 A | 5/1996 | Yamamoto et al. | ......... 385/122 |
| 5,635,125 A | 6/1997 | Ternes et al. | .......... 264/328.18 |
| 5,667,869 A | * 9/1997 | Beretta | |
| 5,807,973 A | * 9/1998 | Bruber et al. | |
| 5,938,994 A | * 8/1999 | English et al. | |
| 6,011,091 A | * 1/2000 | Zehner | ......... 524/13 |
| 6,066,680 A | * 5/2000 | Cope | |
| 6,210,792 B1 | * 4/2001 | Seethamraju et al. | ....... 428/326 |

OTHER PUBLICATIONS

Food Online, Dryer—Product Showcase Center, www.foodonline.com, Turbo–Dryer by Wyssmont Company, Inc., Jan. 3, 1999.*
Wyssmont Turbo–Dryer, www.wyssmont.com.*
World Wide Web, Food Online web page, Dryer—Product Showcase Center, 2 pages.
Ellis, et al., "Vertical Rotary Tray Dryer Processes Pyrophoric Material", Chemical Processing, Nov. 1989, 2 pages.

* cited by examiner

Primary Examiner—Mark Eashoo
(74) Attorney, Agent, or Firm—Standley & Gilcrest LLP

(57) ABSTRACT

The present invention is a system and process for drying and extruding a cellulosic compound. The compound materials are provided to a mixer in a desired ratio. The compound materials are then mixed together. Thereafter, the compound materials can be stored in a non-controlled environment until needed. When it is time to extrude the compound materials, the compound materials are transferred to a dryer at a location remote from the mixer. The dryer has a surface area enabling the compound materials to be sufficiently spread out for drying. The compound materials are substantially uniformly dried to a desired level in the dryer. The compound materials are then transferred to an extruder to be formed into a final net shape.

13 Claims, 3 Drawing Sheets

DRYING AND PROCESSING CELLULOSIC COMPOUNDS

This application claims the benefit of U.S. Provisional Application No. 60/110,028, filed Nov. 25, 1998.

BACKGROUND AND SUMMARY OF THE INVENTION

The present invention relates generally to an in-line drying and extrusion system and, more particularly, to an in-line drying and processing system that produces net shapes from cellulosic compounds. The present invention is useful for many different formulations and material composites which will become apparent to one of ordinary skill in the art upon reading this disclosure. For example, the present invention may be used in conjunction with cellulosic/polymer composites that include polyvinyl chloride (PVC) or high density polyethylene (HDPE).

Cellulosic compounds, e.g., synthetic wood compositions, have been advanced as a substitute for natural wood. Synthetic wood compositions are typically made by combining cellulosic materials and thermoplastic materials. Many prior attempts to manufacture synthetic wood components have failed due to the excessive moisture content of the cellulosic material. For instance, water from the cellulosic material can flash from the surface of an extruded component as a result of rapid devolitalization. The water can also cause steam bubbles to pass from the interior to the exterior of an extruded component thereby leaving a substantial flaw. In addition, surface water can cause cracks, bubbles, and other surface flaws. As a result, cellulosic material having excessive moisture content can compromise the aesthetic and structural quality of an extruded synthetic wood component.

Cellulosic materials have a natural moisture content. For example, some freshly cut trees may have a water content of 30% to 300% by weight based on fiber content. The moisture content of the wood typically decreases as a result of processing, e.g., the making of sawdust. However, the moisture content will still be excessive for many known manufacturing processes if additional steps are not taken to further dry the cellulosic material prior to mixing it with the other compound materials. In addition, these known manufacturing processes typically require additional steps to maintain the low moisture content of the cellulosic material prior to mixing it with the other compound materials. For instance, these known manufacturing processes may require the cellulosic material to be stored in a humidity-controlled environment after it has been dried to a desired level. Otherwise, the cellulosic material will collect additional moisture from the environment.

Known manufacturing processes may also possess other shortcomings. Some known manufacturing processes attempt to use a single heated screw extruder to simultaneously mix and dry the compound materials. Such processes typically require the measured addition of the compound materials to the extruder via heated feeders. Thereafter, the extruder may use high heat to blend the compound materials into a composite melt. However, the cellulosic materials may still not be uniformly dried in the extruder, and the high heat may cause the thermal degradation of the cellulosic materials. In addition, the composite melt may have to be subjected to a vacuum as it passes through the extruder in order to improve the drying of the cellulosic materials.

In light of the shortcomings of known manufacturing processes and systems for cellulosic compounds, a need exists for an improved process and system wherein the compound materials may be stored in a humid environment prior to being introduced the system. Another need exists for an improved process and system wherein the compound materials may be pre-mixed and then stored in a humid environment prior to being introduced to the system. A need also exists for an improved process and system that uses pre-mixed compound materials and does not require the measured addition of the compound materials at any point during the processing. There is also a need for an improved system that utilizes a drying means that operates at cooler temperatures than the drying means of known systems. In addition, a need exists for an improved system that does not need heated feeders to transfer the compound materials to the extruder. Finally, a need exists for an improved system in which the compound materials do not have to be subjected to a vacuum while being processed through the extruder.

The present invention satisfies some or all of these needs. A preferred embodiment of the present invention is a process for drying and extruding a cellulosic compound that is comprised of predetermined materials. The process begins by providing the predetermined materials in a desired ratio. The predetermined materials are then mixed at a first location. Thereafter, the predetermined materials can be stored until needed. When it is time to extrude the predetermined materials, the predetermined materials are transferred to a dryer at a second location remote from the first location. The dryer has a surface area enabling the predetermined materials to be sufficiently spread out for drying. The predetermined materials are substantially uniformly dried to a desired level in the dryer. The predetermined materials are then extruded to obtain a final net shape.

The predetermined materials may include at least one thermoplastic material. For example, the thermoplastic material may be polyvinyl chloride, high density polyethylene, polypropylene, other suitable thermoplastics, or combinations thereof. The predetermined materials may also include wood flour, wood fiber, or other suitable cellulosic materials.

The predetermined materials are preferably mixed using a ribbon blender. In addition, the dryer is preferably a vertical rotary tray dryer. The dryer preferably maintains the drying temperature between about 250 and about 350 degrees Fahrenheit.

The present invention also includes a system for drying and extruding a cellulosic compound comprised of predetermined materials, wherein the predetermined materials have already been mixed together in a desired ratio. The system comprises a dryer and an extruder. The dryer has a surface area which allows the predetermined materials to be sufficiently spread out for drying. Consequently, the dryer is adapted to substantially uniformly dry the predetermined materials to a desired level. The extruder is connected to the dryer. The extruder is adapted to receive the predetermined materials from the dryer. The extruder is then adapted to force the predetermined materials through at least one shaping device to obtain a final net shape.

The dryer may be a vertical rotary tray dryer or any other suitable type of dryer. The dryer is preferably comprised of at least one rotating drying tray. It is preferred that the dryer is adapted to substantially continuously receive the predetermined materials. It is further preferred that the predetermined materials are substantially continuously transferred from the dryer to the extruder.

The present invention includes another embodiment of a system for drying and extruding a cellulosic compound comprised of predetermined materials, wherein the predetermined materials are provided in a desired ratio. The system comprises a mixer, a dryer, and an extruder. The mixer is at a first location, and it is adapted to mix the predetermined materials together. The dryer is at a second location remote from the first location. The dryer is adapted to receive the predetermined materials that have been mixed together. The dry has a surface area enabling the predetermined materials to be sufficiently spread out for drying. As a result, the dryer is adapted to substantially uniformly dry the predetermined materials to a desired level. The extruder is connected to the dryer. The extruder is adapted to receive the predetermined materials from the dryer. After receiving the predetermined materials, the extruder is adapted to force the predetermined materials through at least one shaping device to obtain a final net shape.

This system may include any of the optional or preferred features of the above-described system. In addition, the mixer may be a ribbon blender or another suitable type of mixer. It should be recognized that the mixer may be heated.

In addition to the novel features and advantages mentioned above, other objects and advantages of the present invention will be readily apparent from the following descriptions of the drawings and preferred embodiments.

DETAILED DESCRIPTION OF PREFERRED EMBODIMENT(S)

The present invention is directed to an in-line system for drying and processing cellulosic compounds. However, those skilled in the art should recognize that the present invention may be used in conjunction with many different material formulations, not limited to material composites, that can be processed to form final net shapes. For example the present invention may be used to form final net shapes from inorganic-filled thermoplastic composites.

The cellulosic compound materials may include one or more raw materials including, but not limited to, cellulosic materials, thermoplastic materials, inorganic fillers, cross-linking agents, process lubricants, accelerators, inhibitors, enhancers, compatibilizers, stabilizers, foaming agents, blowing agents, and other conventional materials that are used in cellulosic and/or thermoplastic compounds.

The cellulosic materials may include any combination of sawdust, newspapers, alfalfa, wheat pulp, wood chips, wood fibers, wood particles, ground wood, wood flour, wood flakes, wood veneers, wood laminates, paper, cardboard, straw, cotton, rice hulls, coconut shells, peanut shells, bagass, plant fibers, bamboo fiber, palm fiber, kenaf, or any other similar materials. The thermoplastic materials may include multilayer films, high density polyethylene (HDPE), polypropylene, polyvinyl chloride (PVC), low density polyethylene (LDPE), chlorinated polyvinyl chloride (CPVC), acrylonitrile butadiene styrene (ABS), ethyl-vinyl acetate, other suitable polyethylene copolymers, other suitable thermoplastic materials, or formulations that incorporate any of the aforementioned thermoplastic materials. Examples of inorganic fillers include talc, calcium carbonate, kaolin clay, magnesium oxide, titanium dioxide, silica, mica, barium sulfate, and any other suitable materials. Commonly used cross-linking agents include polyurethanes, such as isocyanates, phenolic resins, unsaturated polyesters, and epoxy resins. Combinations of the aforementioned materials are also known examples of cross-linking agents. In addition, lubricants such as zinc stearate and wax are commonly used to aid the process.

Figure 1:
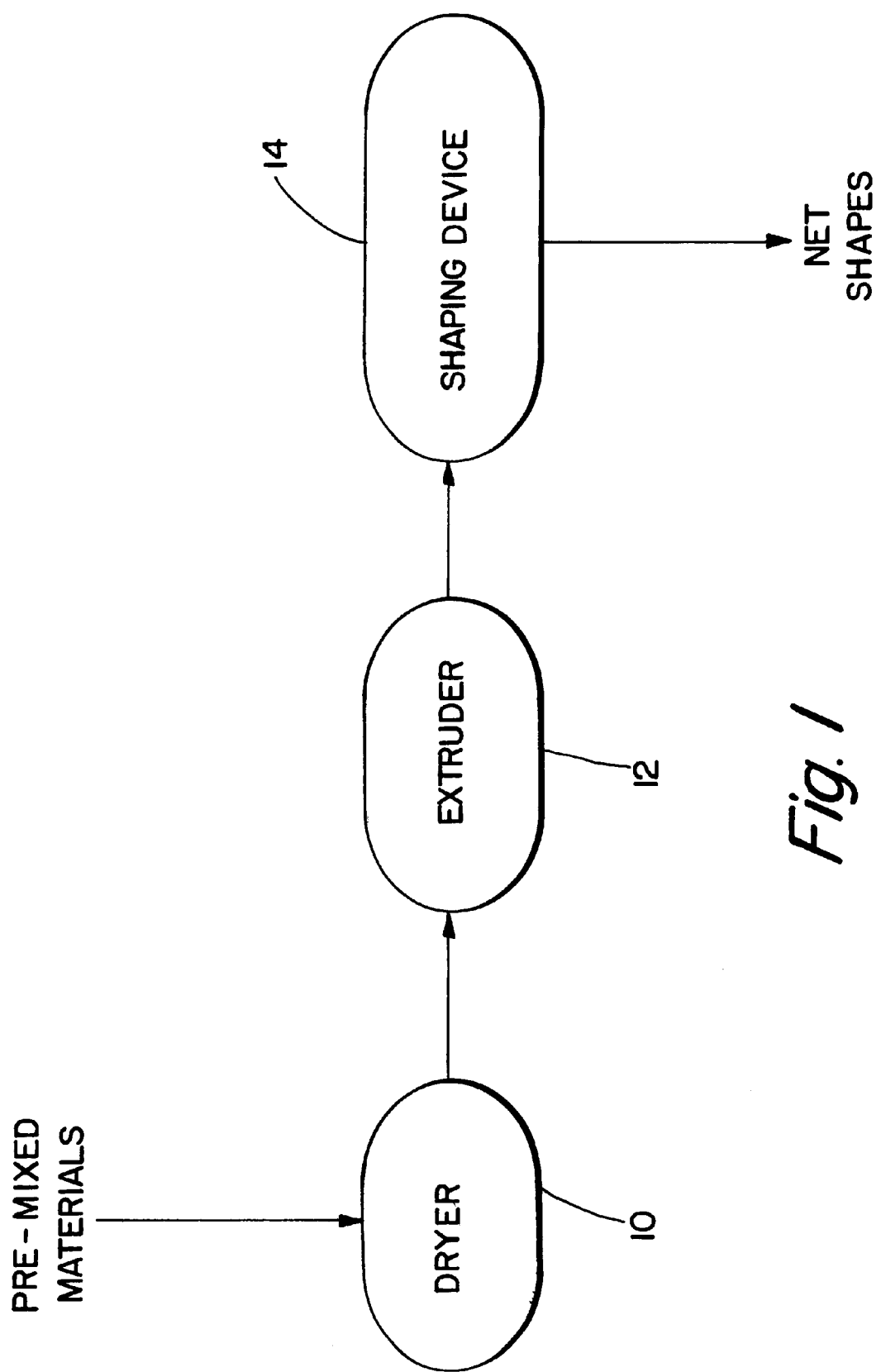
FIG. 1 is a flow diagram illustrating a preferred process of the present invention.

FIG. 1 illustrates a preferred process of the present invention. The compound materials are dry mixed together in a desired ratio prior to being processed by the system. The compound materials, including the cellulosic materials, may be moisture-laden before being dry mixed together. After the compound materials are dry mixed together forming a pre-mix, the pre-mixed compound materials may be placed in storage. The compound materials do not have to be stored in a humidity-controlled environment. Storage may be at a location remote from the location of the dryer and the extruder. When it is time to process the pre-mixed compound materials, the pre-mixed compound materials are provided to a dryer 10. The dryer 10 preferably provides a sufficient surface area for the pre-mixed compound materials to be spread out and thoroughly dried to a desired level. The pre-mixed compound materials may be transferred to an extruder 12 or another suitable processing device after being dried to a desired level. Since the compound materials have already been mixed together in a desired ratio, the compound materials do not have to be remeasured prior to being placed in the dryer 10 or extruder 12. The extruder 12 blends the pre-mixed compound materials into a composite melt which is forced through a shaping device 14 such as a die to form a final net shape.

An example of a dryer 10 that may be utilized in the present invention is a vertical rotary tray dryer. The Wyssmont Company, Inc. of Fort Lee, N.J. provides many examples of a vertical rotary tray dryer (e.g., size SAQ-16, size OE-32, size SAQ-24, and size NE-18 TURBO-Dryers) that may be utilized in the present invention. Other types of dryers may also be utilized in the present invention. It should be recognized that practically any type of commercial dryer having sufficient drying surface area may be utilized in the present invention so long as it is adapted to substantially uniformly dry the compound materials to a desired level. The present inventors have discovered that commercial dryers used in other industries that have relatively large surface areas for heating are capable of drying thermoplastic/cellulosic compounds in commercially reasonable drying times and in commercially reasonable drying quantities.

Figure 2:
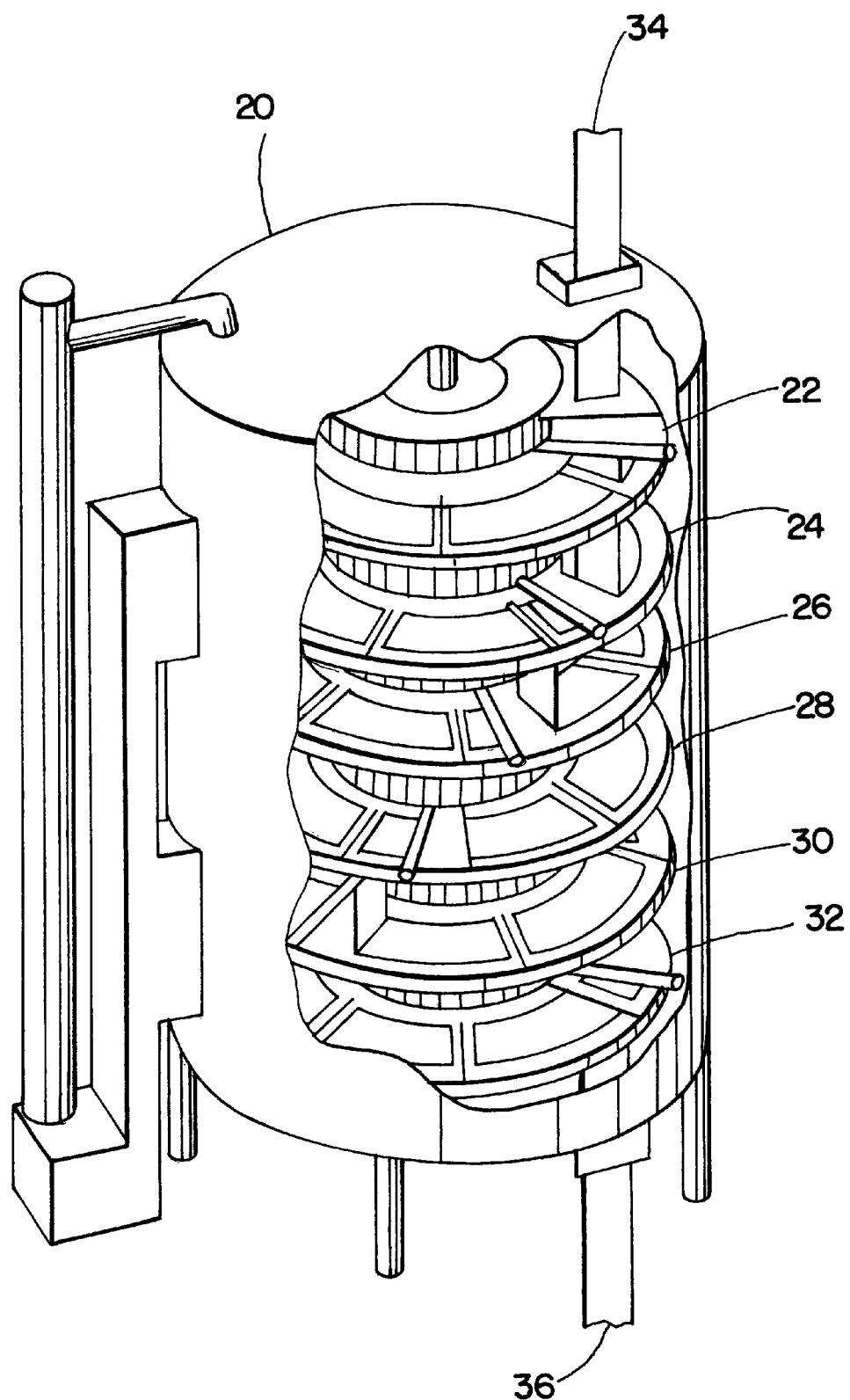
FIG. 2 is a perspective view of a preferred embodiment of a dryer that may be utilized in the present invention.

FIG. 2 shows an example of a dryer 20. A portion of the exterior wall of the dryer 20 is not shown in order to reveal the interior. The dryer 20 is preferably equipped with, or connected to, a dryer feed hopper that receives the pre-mixed compound materials. A variable speed auger feeder then preferably maintains a constant feed rate to the rotating drying tray 22 as shown at 34. Each tray 22, 24, 26, 28, 30, 32 preferably has at least one stationary bed leveler and a tray wiper. Each bed leveler preferably spreads the pile of feed evenly on its respective tray 22, 24, 26, 28, 30, 32 so that it may be uniformly dried. Each tray 22, 24, 26, 28, 30, 32 preferably rotates at a predetermined speed. After trays 22, 24, 26, 28, 30 rotate a predetermined distance, each respective tray wiper transfer the feed through a respective opening to the next lower tray 24, 26, 28, 30, 32. After the drying is completed on the last tray 32, the feed is transferred through an opening directly or indirectly to an extruder or another suitable processing device as shown at 36. For example, any suitable conveyance device may be used to transfer the feed from the dryer 20 to the processing device. In any case, it is preferred that the feed is automatically and substantially continuously transferred from the dryer 20 to the processing device.

The dryer preferably provides continuous, automatic operation. The dryer also preferably provides precise control of the drying temperature and residence time as well as adjustable and automatically maintained drying. It is preferred that the dryer operates in the range of about 250 to about 350 degrees Fahrenheit and more preferably at about 300 degrees Fahrenheit. The dryer may have uniform inside temperature or zoned temperature regions.

The specifications of the dryer may be selected based on the application and the material being processed. For example, a dryer may be selected to achieve the desired input feed rate, output feed rate, and drying capacity for the application. For example, tests of the aforementioned Wyssmont TURBO-Dryers indicate that the following results can be achieved: an input feed rate between about 2,070 and 10,348 pounds per hour; an output feed rate between about 2,000 and 10,000 pounds per hour; and a product moisture content less than 0.5%. Those skilled in the art should recognize that different results can be achieved with different dryers or by adjusting the same dryers.

Figure 3:
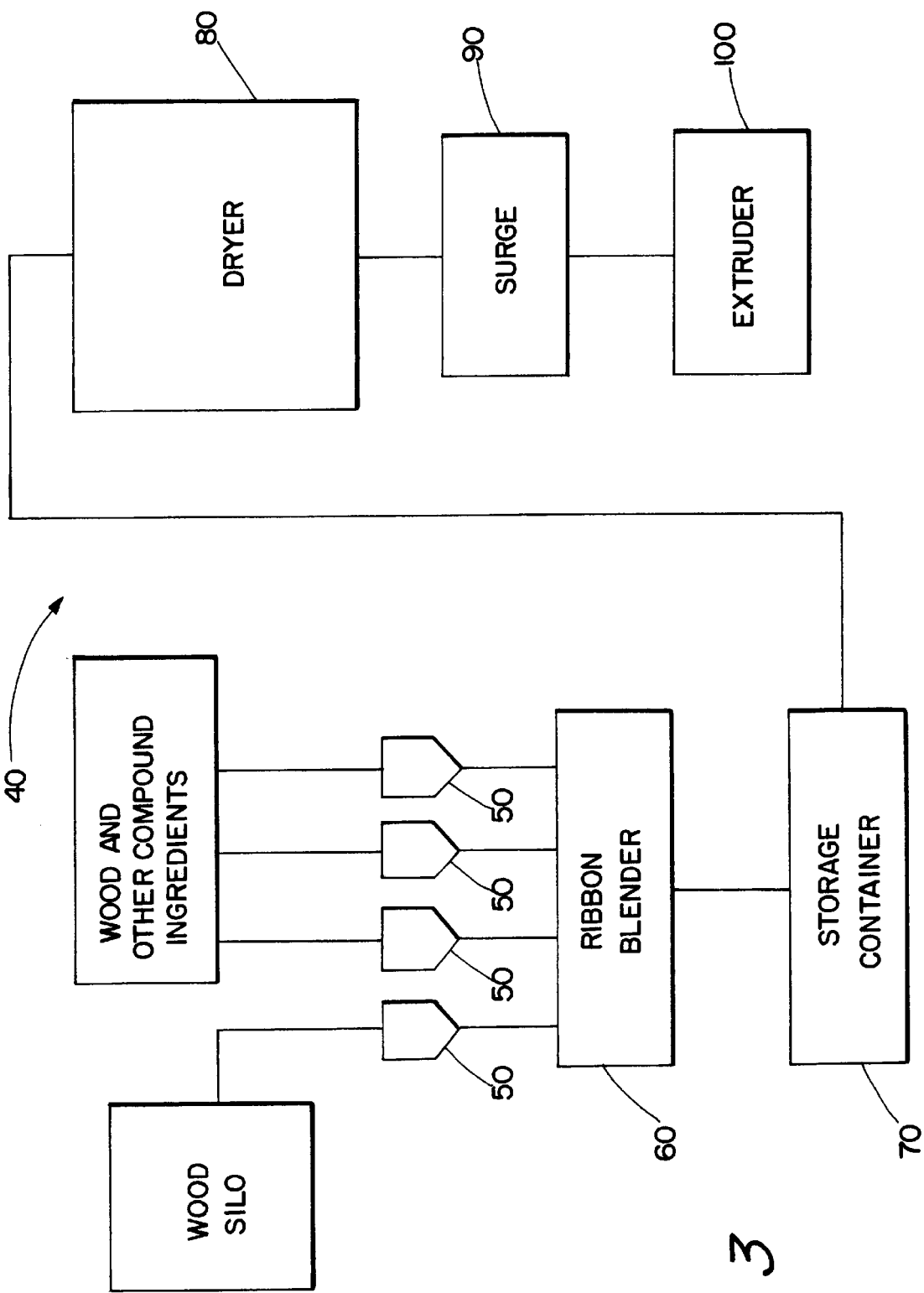
FIG. 3 is a diagram of a preferred embodiment of a system of the present invention.

FIG. 3 is a flow diagram of a preferred embodiment of a system 40 of the present invention. In this embodiment, feeders 50 provide the compound materials to the mixer 60 in a desired ratio. The mixer 60 is preferably a ribbon blender, but it may be any suitable mixing device. The mixer 60 mixes the compound materials together. The compound materials may be stored in storage container 70 after being mixed together. When desired, the compound materials may be transferred by any appropriate method from the storage container 70 to the dryer 80. It is preferred that the compound materials are continuously transferred through the dryer 80 to the extruder 100. In this example, a surge 90 facilitates the transfer of the compound materials from the dryer 80 to the extruder 100. However, it should be recognized that the compound materials may be transferred by any appropriate method or device from the dryer 80 to the extruder 100.

As previously mentioned, the compound materials may be moisture-laden prior to being mixed together in a desired ratio, and the compound materials may be stored in a humid environment after being mixed together. In a preferred system of the present invention, it is not necessary to pre-dry the compound materials prior to transferring them to the dryer 80. After the dryer 80 substantially uniformly dries the compound materials to a desired level, the compound materials are transferred to the extruder 100. The extruder may force the compound materials through one or more dies to obtain a final net shape 100.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A process for drying and extruding a cellulosic compound comprised of predetermined materials, said process comprising:

providing said predetermined materials in a desired ratio, said predetermined materials including at least one thermoplastic material and a cellulosic material;

dry mixing said predetermined materials at a first location;

transferring said mixed predetermined materials to a dryer having a surface area enabling said mixed predetermined materials to be spread out over a wide surface area for drying, said dryer being at a second location remote from said first location;

substantially uniformly drying said mixed predetermined materials to a desired moisture level;

feeding said dried predetermined materials from said dryer to an extruder; and extruding said dried predetermined materials such that said at least one thermoplastic material is melt blended with said cellulosic material and forced through a shaping device to obtain a final shape.

2. The process of claim 1 wherein said at least one thermoplastic material is polyvinyl chloride.

3. The process of claim 1 wherein said at least one thermoplastic material is high density polyethylene.

4. The process of claim 1 wherein said at least one thermoplastic material is polypropylene.

5. The process of claim 1 wherein said cellulosie material is wood flour.

6. The process of claim 1 wherein said cellulosie material is wood fiber.

7. The process of claim 1 wherein said predetermined materials are mixed using a ribbon blender.

8. The process of claim 1 wherein said dryer is a vertical rotary tray dryer.

9. The process of claim 1 wherein said dryer maintains the drying temperature between about 250 and about 350 degrees Fahrenheit.

10. The process of claim 1 wherein said dried predetermined materials are substantially continuously fed from said dryer to said extruder.

11. The process of claim 1 wherein said dried predetermined materials are fed directly from said dryer to said extruder.

12. The process of claim 1 wherein a conveyance device feeds said dried predetermined materials from said dryer to said extruder.

13. The process of claim 1 wherein said dried predetermined materials are automatically fed from said dryer to said extruder.

* * * * *